United States Patent Office 3,443,496
Patented May 13, 1969

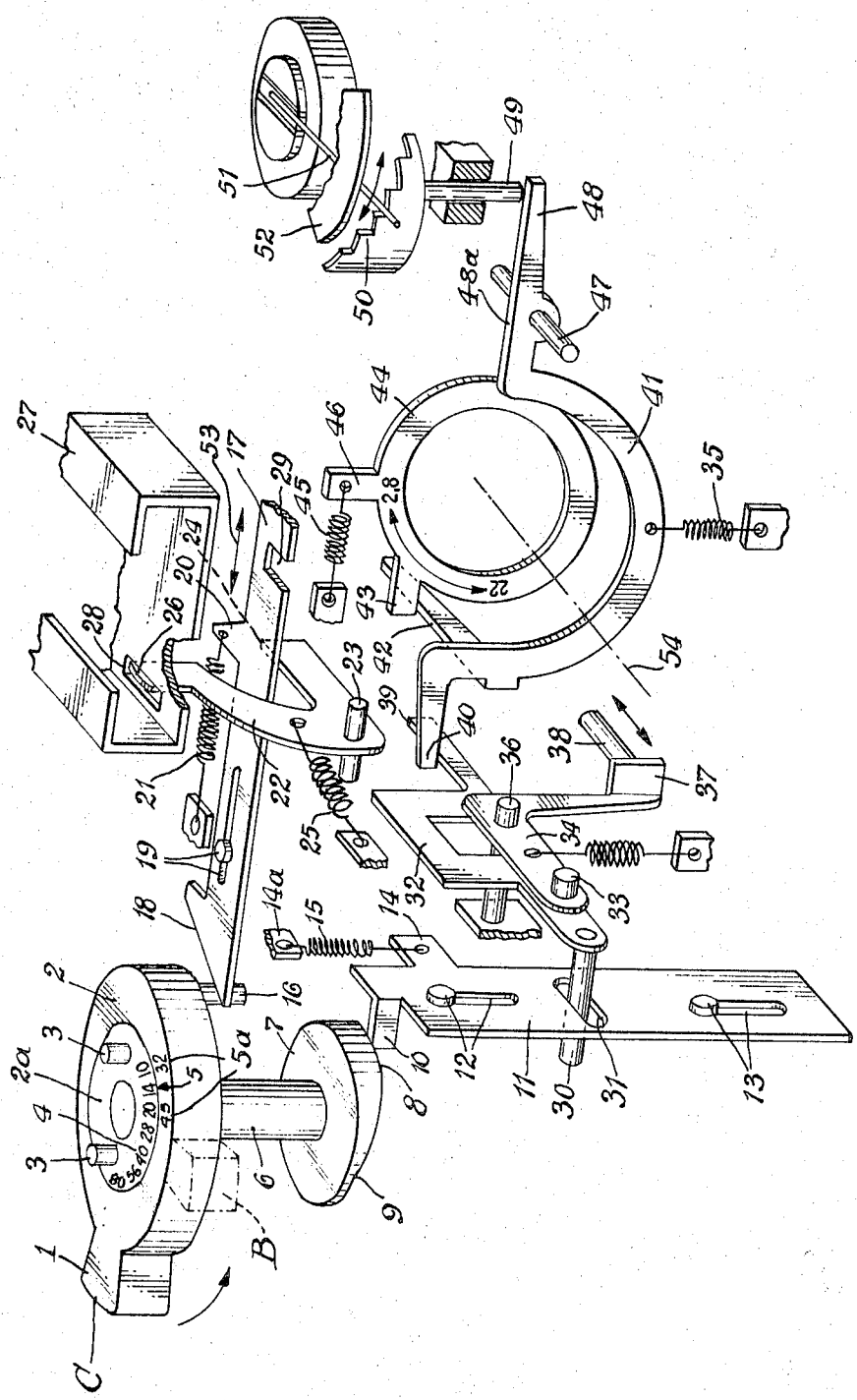

3,443,496
PHOTOGRAPHIC CAMERA
Edgar Sauer, Stuttgart-Rohr, and Johann Hahn and Karl Joos, Stuttgart, Germany, assignors to Zeiss Ikon Aktiengesellschaft, Stuttgart, Germany, a corporation of Germany
Filed Oct. 11, 1966, Ser. No. 585,977
Claims priority, application Germany, Nov. 27, 1965,
Z 11,888
Int. Cl. G03b 19/02
U.S. Cl. 95—11         10 Claims

ABSTRACT OF THE DISCLOSURE

A photographic camera equipped with an automatic daylight exposure range and an automatic flash exposure range is provided with a flash exposure computer having a handle for preselecting a guide number which is movable from an initial position to a terminal position from which upon release the handle returns automatically to the initial position. In said initial position the automatic daylight exposure range is operative, while in said terminal position the automatic flash exposure range is operative and simultaneously introduces into the latter the preselected guide number.

---

The invention relates to a photographic camera which is provided with a daylight exposure range, preferably an automatically operating daylight exposure range, and with a flash bulb exposure range, preferably an automatically operating flash bulb exposure range. While in the automatically operating daylight exposure range the diaphragm in relation to the exposure value and the adjusted shutter speed is substantially automatically formed in that by releasing the camera the position of the deflected pointer of the measuring instrument of the exposure meter system is scanned and the scanning result is introduced into the diaphragm mechanism of the camera where it is translated into the proper diaphragm aperture value, the automatic formation of the flash exposure diaphragm aperture is effetced by the scanning of deflecting cams provided on a distance adjusting ring and on a guide number adjusting member and the subsequent conducting of the scanning results to the diaphragm mechanism.

The selection of the operating range is done by means of a so called change-over or adjusting ring which carries the scales, symbols, etc. of the individual operating ranges to be adjusted with respect to a fixed index. For the flash exposure range there is provided a guide number scale which comprises guide number values from about 10 to 80. When a flash exposure is to be made, the guide number value corresponding to the flash bulb and the speed of the film used has to register with the index. By this registration of one of the guide number values with the index the automatic flash exposure range is rendered operative. Upon setting the distance on the distance adjusting ring the correct flash bulb diaphragm aperture is automatically formed.

To switch the camera from the flash bulb exposure range to the daylight exposure range, preferably the automatic daylight exposure range, the change-over ring needs to be rotated beyond the guide number scale until a symbol "A" representing the automatic daylight exposure range is opposite the index. When the daylight exposure range is to be left for the flash bulb exposure range, the change-over ring must again be rotated until the correct guide number on the guide number scale is opposite the index. A camera of this type is disclosed, for example, in the United States Patents, No. 3,198,096 of Aug. 3, 1965, and No. 3,128,168 of Apr. 7, 1964.

The constantly necessary readjustment of the guide number on the guide number scale constitutes for the camera user, who wishes to make flash bulb exposures between daylight exposures, a rather time consuming manipulation. It is especially awkward when the flash exposures are always made with the same guide number value which nevertheless has to be set on the guide number scale each time the flash exposure range is to be used.

It is the object of the invention in this respect to simplify and speed up the operation of a camera of the aforementioned type. For this purpose the invention provides a device for the preselection of a guide number on a flashgun computer or the like, this guide number preselection device being connected with a handle which is movable from an initial position to a terminal position from which upon release it returns automatically to the starting position. When the handle is in its initial position, the camera is adjusted to the—preferably automatic—daylight exposure range, while moving the handle to the terminal position effects the adjustment of the camera to the—preferably automatic—flash exposure range under simultaneously feeding the preselected guide number to the mechanism forming the diaphragm aperture.

According to the invention, the handle which is movable from the position for daylight exposures to the position for flash bulb exposures is arranged within the reach of one of the hands holding the camera and is constructed to be moved against the action of a return spring from its initial position to its terminal position.

These and other objects of the invention will be described in detail with reference to the accompanying drawing which illustrates in the single figure a diagrammatic view of an exemplary embodiment of the invention.

Referring to the drawing, the operating handle according to the invention is designated with 1. It effects the change of the camera from the daylight exposure range to the automatic flash bulb exposure range and vice versa. The handle 1 extends radially outwardly from an annular carrier 2. The two possible positions of the handle 1 are designated with B and C, of which the solid line position C indicates the position of the automatic flash bulb range, and the dash line position B indicates the automatic daylight exposure range. The carrier 2 is acted on by a not illustrated spring which seeks to pull the carrier 2 together with the handle 1 into the direction of the arrow toward the initial position B representing the automatic daylight exposure range. If therefore the handle 1 is to be moved from the initial position B to the position C representing the automatic flash bulb exposure range, then this is being done against the action of the return spring and the carrier 2 with its handle 1 remain in the flash exposure position C only as long as the pressure of the finger of the operator's hand maintains this position. Immediately upon release of the handle 1 the same leaves the position C and by the action of the return spring returns to the position B.

Within the carrier 2 is provided a guide number preselection device consisting substantially of a disc-shaped member 2a on which is arranged a guide number scale 4 and two diametrically opposed upwardly extending operating pins 3. The guide number values of this guide number scale 4 can be adjusted with respect to an index 5 associated with the carrier 2. In place of this single index 5 there may be provided other registering marks as indicated by 5a which are used when exchangeable objectives are used. These marks designate preferably the focal lengths of the objectives, for example 32 mm. and 45 mm.

The carrier 2 is so constructed as to be sluggish in its movability or it may be locked with respect to the disc 2a on which the guide number scale 4 is arranged, for the purpose of retaining a once selected guide number until another guide number is positively selected and in order to rotate the guide number computer together with the handle as a unit.

Connected with the disc 2a carrying the guide number scale 4 is a downwardly extending shaft 6 which at its lower end is provided with a circular member 7 provided with a guide number deflecting cam 8 and a disconnecting cam 9. This member 7 is fixedly connected with the shaft 6, and the mentioned cams 8 and 9 are constructed in the form of axially extending cup-shaped or elevated cams. From the placement of the cams with respect to the guide number scale on the one hand and from the positions B and C of the handle 1 on the other hand it will be readily seen that the guide number deflecting cam 8 is effective and operative when the automatic flash bulb range is selected and one of the guide numbers has been set. It is furthermore apparent that the guide number deflecting cam 8 is inoperative when the automatic flash bulb exposure range is replaced by the daylight exposure range.

Cooperating with the mentioned cams 8 and 9 is the vertically disposed slide bar 11 acting as a scanning member and being provided at its upper end with a rectangularly deflected section 10 which engages the cam 8 on the member 7. The slide bar 11 is pretensioned by a spring 15 which engages with one end a rectangular extension 14 on the slide bar 11 and with its other end is fastened at 14a to a wall portion of the camera casing. The slide bar 11 is vertically movable and supported by pin-slot connections 12, 13, and another slot 31 in the slide bar 11 is arranged perpendicularly with respect to the slots 12, 13 and receives loosely therein an operating pin 30. It will be readily understood that in relation to the specific elevation of the cams 8 and 9 the slide bar 11 performs perpendicular up and down scanning motions which are transferred as control movements to a lever differential means and from the latter to the diaphragm mechanism of the camera.

The lever differential means consists fiirst of all of a lever 32 one end of which is attached to the pin 30. Guide number scanning motions of the slide bar 11 are therefore translated into rotative movements of the lever 32 about the axis of the pin 30 when the latter is raised or lowered, whereby these rotations of the lever 32 represent the selected guide number value provided the aforedescribed guide number computer has been set to the flash exposure range.

A second lever 34 of the lever differential serves for introducing the selected distance value which must be superimposed on the selected guide number value. For this purpose the lever 34 which is rotatable about a fixed axis 36 is at 33 pivotally joined to the guide number lever 32 at a short distance from the pin 30, and by means of a perpendicularly downwardly extending section 37 and a pin 38 thereon scans or engages a distance deflecting cam which is arranged on the distance adjusting ring, but for the sake of clarity this cam is not illustrated. It is evident that the axial movements of the pin 38 brought about by the distance deflecting cam and the rotative movements of the lever 34 are transferred by reason of its joint connection 33 with the lever 32 to the latter in such a manner that the far end 39 of the lever 32 in its position embodies the sum of both deflections.

This deflection sum is fed to a semi-circular lever 41 which extends around the camera objective and is rotatable about an axis 47 which extends parallel to the optical axis of the camera objective. This level 41 has at one end an outwardly extending projection 40 which engages the lever end 39, while a rectangularly bent portion 42 at the same end of this lever 41 engages a projection 43 on the diaphragm control ring 44. A spring 35 acting upon the center of the semi-circular lever 41 effects an engagement of the projection 40 with the lever end 39, while a spring 45 attached at 46 to the diaphragm control ring 44 provides a positive coupling between the projection 43 and the projection 42 on the lever 41. The lever 41, then, serves as a transmitting member of the sum of the inputs of guide number and distance to the diaphragm mechanism. Therewith, however, its transmitting task is not completed yet, because in addition thereto it also conveys the scanning result of the position of the pointer of the exposure meter which determines the value of the automatic daylight diaphragm in the automatic daylight exposure range. This scanning result is substantially obtained in that the pointer 51 upon release of the camera swings in the direction of either one of the indicated arrows and is pressed against the stationary abutment 52 by the action of not illustrated springs which impel a scanning member 50 with steps thereon upwardly against the pointer 51, whereby the final position of the member 50 depends upon the position of the deflected pointer 51. Between the scanning member 50 and the end 48 of the semi-circular lever 41 is provided a slidably mounted vertical bar 49, the lower end of which is kept in positive engagement with the lever end 48 by the action of the spring 35, since the axis 47 is arranged between the ends of the lever extension 48a. The diaphragm control ring 44 which extends concentrically about the optical axis 54 of the camera objective follows the lever 41, or rather its projection 42, under the action of the spring 45, and the diaphragm aperture corresponding to the measured exposure value is formed in relation to the scanning position of the steps on the scanning member 50 of the diaphragm mechanism.

It has already been indicated in the foregoing that on leaving the flash bulb operating range the guide number deflecting cam 8 has moved away from the scanning projection 10 and that now the cam 9 is being scanned which is of a much lesser elevation than the cam 8 and tapers off to an even height. The vertical slide bar 11 due to the action of the spring 15 reaches its greatest elevation when the cam 9 engages the section 10 of the slide bar 11, which means that the lever 32 is lifted and thereby is pivoted clockwise about the axis of the pin 30 such a distance that the far end 39 of the lever 32 moves away from the projection 40 of the lever 41 quite a distance. This distance is such that all deflecting motion emanating from the distance cam remain ineffective relative to the formation of the diaphragm aperture and this assures the adjustment of distances in the automatic daylight exposure range without causing a change in the diaphragm value.

The carrier 2 of the handle 1 is further provided with a downwardly extending control pin 16 which cooperates with a horizontally disposed slide bar 17 guided slidably in slots 19 and having at one end a bevelled edge 18 which is in contact with the pin 16. This slide bar 17, of whose slot and pin connections 19 only one is illustrated, is provided between its ends with a lateral projection 20 which is engaged by a spring 21 which keeps the edge 18 of the slide bar 17 in positive engagement with the pin 16. The slide bar 17 is furthermore provided at its other end with a lateral recess 29 which cooperates with a locking member comprising substantially an angular lever 22 rotatable at its apex about an axis 23. This angular lever 22 will under certain circumstances enter lockingly with its lower end 24 into the recess 29, while the upper lever end 26 is constructed to protrude from a slot 28 in the finder socket 27 of the camera. The angular lever 22 is pretensioned by a spring 25 which urges the lever 22 to move counterclockwise.

As already indicated, the cooperation between the angular lever 22 and the slide bar 17 serves to bring about a locking effect in order to prevent the handle 1 from being pushed out of its initial position into the position C in the event that not all requirements for making a flash bulb exposure are met. The most important requisite, of course, is the flashgun itself which has to be inserted into the socket 27. If the flashgun is missing, the lever end 24 will slide into the lateral recess 29 of the slide bar 17, whereby with reference to the drawing it will be understood that the handle 1 is in its initial position B in which the slide bar 17, following the pull of the spring 21, has been displaced to the left to such an extent that the locking connection between the lever end 24 and the recess 29 becomes effective. It will be understood that under these circumstances a movement of the handle 1 into the position C is not possible because the pin 16 is stopped by the bevelled edge 18 of the locked slide bar 17.

This locking, however, will be released by inserting a flashgun into the socket 27. Then the lever end 26 is pushed down into the slot 28, the angular lever 22 rotates clockwise a short distance against the action of the spring 25 and thereby the lever end 24 is moved out of the lateral recess 29 of the slide bar 17. A transfer of the handle 1 into the position C then requires only that the energy of the spring engaging the handle 1 and of the spring 21 be overcome.

Preferably, by moving the slide bar 17 to the right in the direction of the arrow 53, a flash bulb exposure of for instance 1/30 second is automatically adjusted; furthermore, a cover-up and indicating device is actuated by which in the flash bulb exposure range the reflection of a red-green indication of the automatic daylight exposure range is covered and, if desired, a flash bulb symbol is introduced into or adjacent to the viewfinder area. Provision is also made for a switch device to be operated by the slide bar 17, which has the effect that in the automatic daylight exposure range the flashgun circuit is interrupted, while in the adjusted flash bulb exposure range this circuit is closed. In single lens mirror reflex cameras the flashgun symbol may preferably be introduced in the viewfinder ray path in the center of the Fresnel lens.

The invention has the great advantage that the camera user, who tends to work practically with the same guide number, has to set the guide number only once on the guide number preselecting member and that, if he wishes to change from the automatic daylight exposure range to the automatic flash bulb exposure range, he merely needs to adjust by the pressure of a finger a handle which readies the camera for the automatic flash bulb operation by simultaneously introducing the preselected guide number. The bothersome resetting of the desired guide number on the change-over ring required in previous cameras each time the flash bulb range is to be used, has thus been eliminated. The invention makes it possible to switch the camera from automatic daylight operation to automatic flash bulb operation in a second's time. If again automatic daylight exposures are to be made, then it is merely necessary to let go of the handle which returns into its initial position and therewith renders the automatic daylight exposure range again operative under automatically reinstating the previously selected exposure time.

What we claim is:

1. In a photographic camera provided with an automatic daylight exposure range and an automatic flash bulb exposure range, means for the preselection of a guide number on a flash exposure computer, a handle connected to said guide number preselection means and being movable from an initial position to a terminal position from which upon release said handle returns automatically to said initial position, whereby in said initial position the automatic daylight exposure range is operative, while by moving the handle into said terminal position the automatic flash bulb exposure range is adjusted thereby simultaneously introducing the preselected guide number into a lens aperture mechanism.

2. A photographic camera according to claim 1, in which said handle for adjusting the flash bulb exposure range from the position of the daylight exposure range is arranged within the reach of one of the hands of the camera operator holding said camera, said handle upon release being automatically returned to its initial position.

3. A photographic camera according to claim 1, in which said preselection guide number means includes a movable member with a guide number scale thereon and serves for presetting a guide number with respect to an index, said member being frictionally coupled with said handle and connected to a cam carrier which is provided with a guide number deflecting cam and a disconnecting cam, a guide number scanning member for successively engaging said cams, whereby said guide number deflecting cam is effective in the flash bulb exposure range and by change of positions of intermediary members causes the preselected guide number to be introduced into said lens aperture mechanism, said disconnecting cam being effective in the daylight exposure range and causing said intermediary members to be moved into an ineffective position so as to prevent said lens aperture mechanism from being influenced by means adjusting the guide number and distance for forming a flash exposure diaphragm aperture.

4. A photographic camera according to claim 3, in which said intermediary members comprise a lever differential comprising a control member operatively connected with said cams and embodying in one of its positions the sum of the selected guide number and distance values and acting in the flash exposure range on said lens aperture mechanism to form the flash bulb exposure diaphragm aperture.

5. A photographic camera according to claim 3, including a distance adjusting ring, and in which said guide number scanning member when engaging said disconnecting cam in the daylight exposure range causes said intermediary members to occupy such a position that an influencing of said lens aperture mechanism by a selection of distance values on said distance adjusting ring is prevented.

6. A photographic camera according to claim 1 with a shutter speed adjusting member (17), and in which in connection with said handle said shutter speed adjusting member is so adjusted that when moving said handle into a position corresponding to the flash bulb exposure range a shutter speed of 1/30 sec. is automatically adjusted.

7. A photographic camera according to claim 6, including a pin on the handle engaging positively with a slide bar (17) which is operatively connected with the exposure adjusting mechanism of the shutter in such a manner that in the initial position of the handle, namely in the daylight exposure range, an adjustment of the exposure adjusting mechanism by said slide bar is prevented, while in the other terminal position of said handle corresponding to the flash bulb exposure range a predetermined shutter speed, such as 1/30 sec., is automatically set, said shutter speed on the return of said handle to its initial position being automatically erased.

8. A photographic camera according to claim 6, including a pin on the handle engaging positively with a slide bar (17) which is operatively connected with the exposure adjusting mechanism of the shutter in such a manner that in the initial position of the handle, namely in the daylight exposure range, an adjustment of the exposure adjusting mechanism by said slide bar is prevented, while in the other terminal position of said handle corresponding to the flash bulb exposure range a predetermined shutter speed, as 1/30 sec., is automatically set, said shutter speed on the return of said handle to its initial position being automatically erased, and including a locking member which prevents the handle from being moved into the terminal position corresponding to the flash bulb exposure range in the event that not all prerequisites for making a flash bulb exposure are fulfilled.

9. A photographic camera according to claim 6, including a pin on the handle engaging positively with a slide bar (17) which is operatively connected with the exposure adjusting mechanism of the shutter in such a manner that in the initial position of the handle, namely in the daylight exposure range, an adjustment of the exposure adjusting mechanism by said slide bar is prevented, while in the other terminal position of said handle corresponding to the flash bulb exposure range a predetermined shutter speed, such as 1/30 sec., is automatically set, said shutter speed on the return of said handle to its initial position being automatically erased, and including a locking member which prevents the handle from being moved into the terminal position corresponding to the flash bulb exposure range in the event that not all prerequisites for making a flash bulb exposure are fulfilled, said locking member being adapted to extend into a socket of the camera when the flashgun is not attached to said socket and thereby to prevent a movement of said handle into said terminal position thus precluding an adjustment of the camera to the flash bulb exposure range.

10. A photographic camera according to claim 9, in which the locking effect of said locking member is produced by an engagement of the lever end of said locking member into a recess provided in said slide bar, said locking engagement being lifted by moving an end of said lever out of said recess by inserting a flashgun into said socket.

References Cited

UNITED STATES PATENTS

| | | | |
|---|---|---|---|
| 2,590,161 | 3/1952 | Dorsey | 95—64 |
| 2,999,438 | 9/1961 | Nerwin | 95—10 |
| 3,118,356 | 1/1964 | Sauer et al. | 95—10 |
| 3,120,791 | 2/1964 | Bundschuh et al. | 95—11 |
| 3,175,479 | 3/1965 | Beach et al. | 95—11 |
| 3,176,599 | 4/1965 | Anwyl | 95—10 |
| 3,208,363 | 9/1965 | Easterly et al. | 95—11 |
| 3,228,314 | 1/1966 | Köppen | 95—11.5 |
| 3,273,483 | 9/1966 | Weidner et al. | 95—64 |
| 3,309,977 | 3/1967 | Sauer et al. | 95—11.5 X |
| 3,368,468 | 2/1968 | Rentschler | 95—64 X |

NORTON ANSHER, *Primary Examiner.*

CHARLES E. SMITH, *Assistant Examiner.*

U.S. Cl. X.R.

95—10, 64